United States Patent [19]
Beck et al.

[11] Patent Number: 4,946,369
[45] Date of Patent: Aug. 7, 1990

[54] SILICONE MOLD AND ELASTOMER TOOL LIFE

[75] Inventors: Earl W. Beck, Annaheim, Calif.; Schuyler B. Smith, Midland, Mich.

[73] Assignee: Dow Corning Corporation, Midland, Mich.

[21] Appl. No.: 368,478

[22] Filed: Jun. 19, 1989

[51] Int. Cl.$^5$ .............................................. B44D 1/20
[52] U.S. Cl. ................................ 427/133; 264/338; 427/230; 427/384
[58] Field of Search ................ 427/133, 230, 384; 264/338

[56] References Cited

U.S. PATENT DOCUMENTS

| | | | |
|---|---|---|---|
| 2,811,408 | 10/1957 | Braley | 427/133 |
| 3,607,397 | 7/1971 | Walters | 134/3 |
| 4,070,224 | 1/1978 | Zemlin | 427/302 |
| 4,534,928 | 8/1985 | Martin | 427/133 |
| 4,775,554 | 10/1988 | Ponjee | 427/133 |

FOREIGN PATENT DOCUMENTS

| | | | |
|---|---|---|---|
| 0038826 | 3/1982 | Japan | 427/133 |
| 0167694 | 10/1983 | Japan | 427/133 |

Primary Examiner—Janyce Bell
Attorney, Agent, or Firm—Edward C. Elliott

[57] ABSTRACT

Silicone elastomer molds or tools are used to shape amine containing resins. If the mold is coated with a silane of the formula $R_aSiX_{4-a}$, where R is a monovalent halogenated hydrocarbon having 1 through 6 carbon atoms and the halogen selected from the group consisting of chlorine, bromine, and iodine, X is a monovalent radical that reacts with a hydroxyl radical on silicon, and a is 1 through 3, before use, the shrinkage of the mold with repeated use is decreased and the elastomeric mold or tool life is greatly extended.

8 Claims, No Drawings

SILICONE MOLD AND ELASTOMER TOOL LIFE

BACKGROUND OF THE INVENTION

1. Field of the Invention

This invention relates to improving the life of molds or elastomeric tooling made of silicone elastomer.

2. Background Information

Molds and tools manufactured of silicone rubber have proven very useful due to their ability to produce fine detail and to operate, if necessary, at elevated temperatures. They are also desirable because of their ability to provide release to many different kinds of materials which are formed in contact with the silicone rubber.

Silicone elastomers have been used to form tooling for the forming of fabric reinforced epoxy resin parts for use in the aircraft industry. One method of forming these parts is by vacuum bag molding of epoxy preimpregnated fabric against a silicone elastomer tool, then curing the epoxy resin under the influence of vacuum and heat. In some cases, the silicone elastomer tooling is affected by the vacuum, heat, and chemicals present during the curing process so that the elastomer degrades, losing some of its weight and shrinking. If the shrinking is excessive, the tool can no longer be used.

SUMMARY OF THE INVENTION

The useful life of silicone elastomer molds and elastomeric tooling can be extended when used in conjunction with amine containing resins by coating the surface of the mold or elastomeric tooling, which will be in contact with the resin, with a silane of the formula $R_aSiX_{4-a}$, where R is a monovalent halogenated hydrocarbon having 1 through 6 carbon atoms and the halogen is selected from the group consisting of chlorine, bromine, and iodine; X is a monovalent radical that reacts with a hydroxyl radical on silicon; and a is 1 through 3.

DESCRIPTION OF THE INVENTION

This invention relates to a method for improving the life of a silicone elastomer mold or tool used in contact with an amine containing molding material, the method consisting essentially of coating the surface of the elastomer mold or elastomeric tool, to be contacted by the amine containing molding material, with a protective coating selected from the group consisting of a silane of the formula $R_aSiX_{4-a}$, where R is a monovalent halogenated hydrocarbon having 1 through 6 carbon atoms and the halogen selected from the group consisting of chlorine, bromine, and iodine, X is a monovalent radical that reacts with a hydroxyl radical on silicon, and a is 1 through 3; a partial hydrolyzate of the above silane; and a mixture of the two.

One of the methods for producing large vacuum bag molded parts from fiber reinforced resins makes use of molds or elastomeric tooling of silicone rubber to give the part the required shape. The preimpregnated fiber reinforcement tape or fabric is laid up against the elastomeric tool, placed in a rigid hard tool to shape and support the elastomeric tool, then placed in a vacuum bag, evacuated, and then heated to allow the resin to melt, the impregnated material to take on the shape of the elastomeric tool, and the resin to cure. The assembly is then allowed to cool and the part removed from the elastomeric tooling. In practice, it has been found that when the elastomeric tooling is of a large size, many feet in length, and the resin is of a type that is cured with amine material, such as epoxy resin, there is enough shrinkage of the silicone rubber tool over a number of cycles that the elastomeric tool can no longer be used. The method of this invention is the result of work done to discover some method of extending the useful life of silicone rubber molds or elastomeric tooling when used with amine containing resins.

Many types of silicone rubber are used to make molds or elastomeric tooling. Compositions are available which are heat cured with organic peroxide catalysts as well as compositions which are cured by the reaction between unsaturated hydrocarbon radicals reacting with hydrogen on silicon in the presence of catalysts. It is believed that any type of silicone rubber will be attacked by resins which contain amine compounds, particularly when the resin is heated to accelerate the cure. The method of this invention can be used on any type of silicone rubber mold or elastomeric tool.

The silane used in the method of this invention is a silane of the formula $R_aSiX_{4-a}$, where R is a monovalent halogenated hydrocarbon having 1 through 6 carbon atoms and the halogen selected from the group consisting of chlorine, bromine, and iodine, X is a monovalent radical that reacts with a hydroxyl radical on silicon, and a is 1 through 3. The halogenated hydrocarbon can be, for example, chloromethyl, 3-chloropropyl, 3,3,3,-trichloropropyl, chloroisopropyl, and haloaryl radicals such as 2,4-dichlorophenyl or dibromophenyl. The preferred halogen is chlorine, but bromine and iodine can also be used. The monovalent radical, X, that reacts with a hydroxyl radical of silicone is preferably an alkoxy radical, that is groups of the formula -OZ when Z is any hydrocarbon or halogenated hydrocarbon group such as methyl, ethyl, isopropyl, octadecyl, allyl, and hexenyl. X can also be any hydrocarbon ether radical such as 2-methoxyethyl, 2-ethoxyisopropyl, p-methoxyphenyl; any acyl radical such as acetyl, propioyl; or any N,N-amino radical such as dimethylamino, diethylamino; and any ketoximo radical of the formula $-ON=CM_2$ or $-ON=CM'$ in which M is any monovalent hydrocarbon or halogenated hydrocarbon radical and M' is any divalent hydrocarbon radical both valences of which are attached to the carbon, such as hexylene. The number of monovalent hydrocarbon radicals on the Si atom of the silane can vary from 1 to 3, the preferred number is 1. A preferred silane is chloropropyltrimethoxysilane because of its ready availability.

The method of this invention applies a coating of the silane to the surface of the silicone rubber mold or elastomeric tool that is going to be in contact or exposed to the vapors of any amine given off by the resin being used. A preferred method of applying the coating first prepares a mixture of the silane in solvent at a concentration of from 0.01 to 10 percent by weight of silane in the mixture. The solvent amount is not critical, it is used to aid in applying a uniform coating of silane to the silicone rubber mold or elastomeric tool surface. The amount of silane used for optimum results probably depends upon how much amine the silicone rubber is exposed to. The solvent can be any solvent that dissolves or disperses the silane, but it should be relatively moisture free. The solvent should be one which does not attack or swell the silicone rubber excessiVely during the application of the silane coating. A preferred solvent is an alcohol which is volatile enough to leave the surface in a reasonalble time and one which is not toxic or too flamable. For these reasons, isopropyl alcohol is the preferred solvent. If excessive moisture is present in the solvent, it may react with the silane and storage of the mixture could become a problem. Partial hydrolyzates of the silane are also felt to be suitable for use in the invention. Up to one part of water by weight per 10 parts of silane can be added to hydrolyze the silane. The mixture will stabilize in about 24 hours at room temperature and will have a shelf life of at least 6 months. As long as the hydrolysis is not carried out to the point where the coating can not be applied uniformly, there should be no problem.

The silicone rubber mold or elastomeric tooling can be coated with the silane mixture by painting, spraying, or dipping. The preferred amount of silane in solvent depends also upon the method of application. After coating, the coated mold or elastomeric tool is allowed to air dry to remove the solvent. If a higher boiling solvent is used, it is desirable to heat the coated mold or elastomeric tool in order to insure evaporation of the solvent. The temperature should not be high enough to cause evaporation of the silane.

After the mold or elastomeric tool is properly coated with the silane mixture and the solvent removed, the coated elastomeric tool is ready for use in whatever molding procedure is being used.

The method of this invention prevents or minimizes the amount of shrinkage of a silicone rubber mold or elastomeric tool which is used to form amine containing resins. Its use allows a longer useful life for such molds and elastomeric tooling.

The following example is included for illustrative purposes only and should not be construed as limiting the invention which is properly set forth in the appended claims.

EXAMPLE

An experiment was performed to illustrate the improvement obtained by the method of this invention.

A large slab of silicone rubber was prepared by forming a commercial silicone mold making composition based upon a cure system consisting of the reaction of vinyl radicals and hydrogen on silicon radicals in the presence of a platinum catalyst. The composition contained about 49 percent by weight polydimethylsiloxane, about 23.5 percent silicone resin, and about 27.5 percent of treated, reinforcing silica. The two part composition was mixed and formed into a slab, then cured for 8 hours at 350° F. Samples, 14"×1"×½", were then prepared by cutting the slab. Index marks were placed on the surface of each piece 11 ½ to 12 inches apart, then the distance between the index marks was carefully measured to an accuracy of plus or minus 0 001 inch.

Various configurations representing varieties of molding conditions were then prepared from the samples. Sample 1 was the piece of the silicone rubber described above, with no coating or impregnated fabric. Sample 2 was a piece of the silicone rubber, then three coats of a commercial release coating (Frekote 700, from Hysol Corporation, Seabrook, N.H.), a peel ply of 934 resin (amine catalyzed epoxy resin) on both sides of a nylon film, and then 10 plies graphite fabric impregnated with an amine catalyzed epoxy resin. Sample 3 was a piece of the silicone rubber with a layer of the peel ply and then 10 plies of the impregnated fabric. Sample 4 was a piece of the silicone rubber with 10 plies of the impregnated fabric. Samples 5 and 6 were a piece of the silicone rubber which had been painted with a mixture of 10 percent by weight chloropropyltrimethoxysilane in isopropanol. After painting, the isopropanol was allowed to evaporate, then 10 plies of the impregnated fabric were placed over the rubber. Samples 7 and 8 were a piece of the silicone rubber which had been coated with the silane as in samples 5 and 6, then a layer of the peel ply, then 10 plies of the impregnated fabric Each of the above sample constructions was laid out upon a large metal caul plate. A high temperature putty was used to make dams between each sample. The plate was then covered with a porous bleeder cloth and the entire system was sealed inside a nylon vacuum bag film. A vacuum of 25 inches of mercury was drawn to remove all of the air in the contents and to cause the various samples to be tightly compressed, forcing the peel ply and impregnated fabric layers tightly against the silicone rubber. The bag was forced into the putty between each sample, forming a vapor tight compartment around each sample. The bag was sealed, under vacuum and the entire construction was placed into an autoclave The oven was pressurized to 85 pounds per square inch and heated until the metal caul plate reached 350° F. After 2 hours at temperature, the oven was cooled and the pressure removed. The sample molded constructions were then disassembled and the distance between the marks on each silicone rubber sample were measured and compared to the original distance to determine how much shrinkage of the silicone rubber had occurred.

The entire procedure was repeated for 8 cycles. The Frekote 700 release coating and the silane coating was reapplied, as above, after each cycle The results of the shrinkage measurements are shown below in Table I. Samples 5 through 8 having the coating of silane, show much less shrinkage upon exposure to the resin than do samples 2 through 4, which do not have the silane coating.

TABLE I

| Sample No. | | Run Number | | | | | | | |
|---|---|---|---|---|---|---|---|---|---|
| | | 1 | 2 | 3 | 4 | 5 | 6 | 7 | 8 |
| 1** | Shrink per run, % | 0.3 | 0.08 | 0.04 | 0.04 | 0.08 | 0.04 | 0.08 | 0.04 |
| | Cumulative shrink, % | 0.03 | 0.38 | 0.42 | 0.46 | 0.54 | 0.58 | 0.66 | 0.70 |
| 2* | Shrink per run, % | 0.4 | 0.21 | 0.22 | 0.30 | 0.15 | 0.15 | 0.10 | 0.10 |
| | Cumulative shrink, % | 0.4 | 0.61 | 0.83 | 1.13 | 1.28 | 1.43 | 1.53 | 1.63 |
| 3* | Shrink per run, % | 0.55 | 0.46 | 0.34 | 0.20 | 0.17 | 0.09 | 0.13 | |
| | Cumulative shrink, % | 0.55 | 1.01 | 1.35 | 1.55 | 1.75 | 1.92 | 2.01 | 2.14 |
| 4* | Shrink per run, % | 0.55 | 0.50 | — | 0.20 | 0.13 | 0.13 | 0.09 | 0.13 |
| | Cumulative shrink, % | 0.55 | 1.05 | — | 1.25 | 1.38 | 1.51 | 1.60 | 1.73 |
| 5 | Shrink per run, % | 0.4 | 0.08 | 0.10 | 0.00 | 0.04 | 0.00 | 0.00 | 0.00 |
| | Cumulative shrink, % | 0.4 | 0.48 | 0.58 | 0.58 | 0.62 | 0.62 | 0.62 | 0.62 |
| 6 | Shrink per run, % | 0.4 | 0.08 | 0.08 | 0.04 | 0.04 | 0.00 | 0.00 | 0.00 |
| | Cumulative shrink, % | 0.4 | 0.48 | 0.56 | 0.60 | 0.64 | 0.64 | 0.64 | 0.64 |

TABLE I-continued

| Sample No. | | Run Number | | | | | | | |
|---|---|---|---|---|---|---|---|---|---|
| | | 1 | 2 | 3 | 4 | 5 | 6 | 7 | 8 |
| 7 | Shrink per run, % | 0.3 | 0.10 | 0.08 | 0.09 | 0.00 | 0.00 | | |
| | Cumulative shrink, % | 0.3 | 0.04 | 0.48 | 0.57 | 0.57 | 0.57 | | |
| 8 | Shrink per run, % | 0.3 | 0.10 | 0.08 | 0.13 | 0.00 | 0.00 | | |
| | Cumulative shrink, % | 0.3 | 0.40 | 0.48 | 0.61 | 0.61 | 0.61 | | |

**control silicone rubber tooling with no resin present
*comparative examples
Samples 5 through 8 are coated with the chloropropyltrimethoxysilane That which is claimed is:

1. A method for improving the life of a silicone elastomer mold or elastomeric tool used in contact with an amine containing molding material, the method consisting essentially of coating the surface of the elastomer mold or elastomeric tool, to be contacted by the amine containing molding material, with a protective coating selected from the group consisting of a silane of the formula $R_aSiX_{4-a}$, where R is a monovalent halogenated hydrocarbon having 1 through 6 carbon atoms and the halogen selected from the group consisting of chlorine, bromine, and iodine, X is a monovalent radical that reacts with a hydroxyl radical on silicon, and a is 1 through 3; a partial hydrolyzate of the above silane; or a mixture of the two.

2. The method of claim 1 wherein the protective coating is a silane.

3. The method of claim 2 wherein the silane is present as a mixture with a solvent, there being from 0.01 to 10 percent by weight of the silane in the mixture.

4. The method of claim 3 in which the solvent is isopropyl alcohol.

5. The method of claim 2 in which the silane is chloropropyltrimethoxysilane.

6. The method of claim 3 in which the silane is chloropropyltrimethoxysilane and the solvent is isopropyl alcohol.

7. The method of claim 1 in which the silane is a partial hydrolysate.

8. The method of claim 1 in which there is also present an aminosilane catalyst.

* * * * *